United States Patent
Kesinger et al.

[11] 3,722,137
[45] Mar. 27, 1973

[54] TRANSPLANT HANDLING MEANS

[75] Inventors: Donald A. Kesinger, Denver; Leland S. Inscho, Jr., Broomfield, both of Colo.

[73] Assignee: The Gales Rubber Company, Denver, Colo.

[22] Filed: Dec. 30, 1970

[21] Appl. No.: 102,582

[52] U.S. Cl. .......................47/34.13, 111/1, 47/37, 47/56
[51] Int. Cl. .....................A01g 9/10, A01c 11/02
[58] Field of Search............47/1.2, 16, 34, 34.13, 37, 47/56, 58; 111/96, 1

[56] References Cited

UNITED STATES PATENTS

| | | | |
|---|---|---|---|
| 3,375,607 | 4/1968 | Melvold | 47/37 |
| 3,611,634 | 10/1971 | Dalton | 47/34.13 X |
| 3,362,106 | 1/1968 | Goldring | 47/56 |
| 3,209,492 | 10/1965 | Brandt | 47/16 |
| 3,331,155 | 7/1967 | Chancellor | 47/37 |
| 3,517,629 | 6/1970 | Bridges et al. | 111/96 |

FOREIGN PATENTS OR APPLICATIONS 1,041,133   9/1966   Great Britain..........................47/56

Primary Examiner—Robert E. Bagwill
Attorney—Raymond Fink, H. W. Oberg, Jr. and Curtis H. Castleman, Jr.

[57] ABSTRACT

Process and apparatus are described for handling and treating a plurality of seeds including the method of (1) forming a continuous transplant carrier provided with spaced containers, each of sufficient size to accommodate a germinated seed or plant, and media to support growth and provided with means for exchange of moisture and gases, (2) inserting seed and support media within the containers, and (3) germinating and preculturing the seeds in the containers for at least a period of time to allow radical and cotyledon to emerge from the seed coats and develop. The invention is particularly useful in the automated transplanting of a variety of plants including high value crops such as sugar beets and lettuce.

7 Claims, 5 Drawing Figures

PATENTED MAR 27 1973  3,722,137
SHEET 1 OF 2
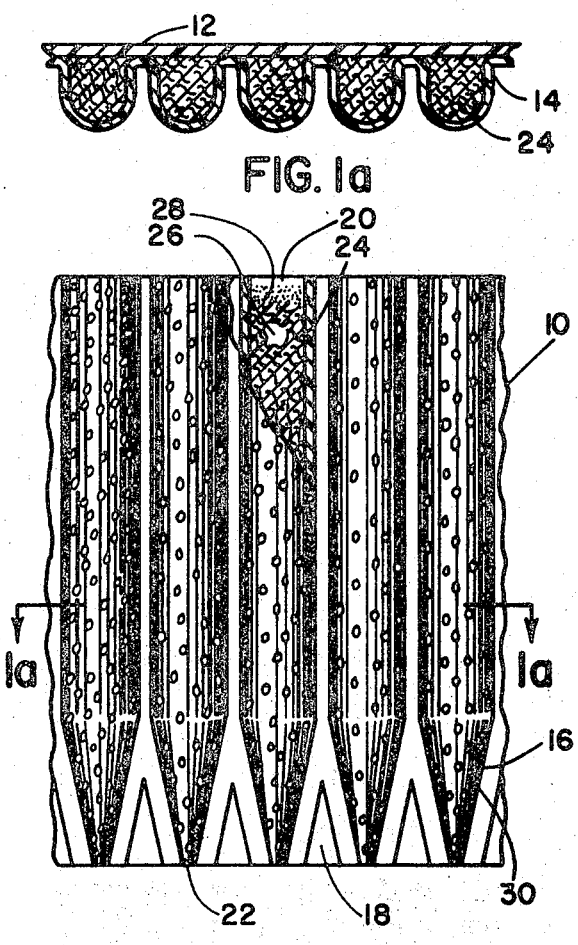
FIG. 1a
FIG. 1
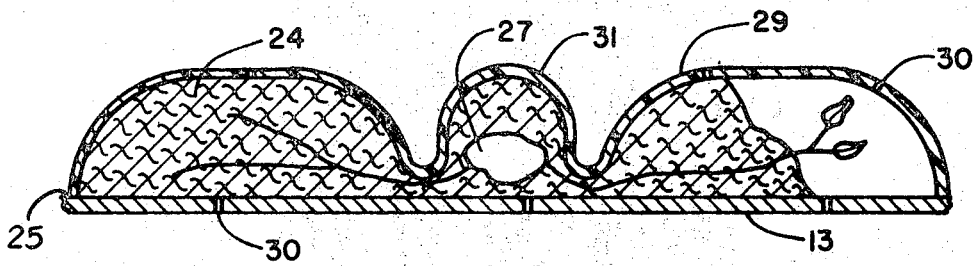
FIG. 2
INVENTORS
DONALD A. KESINGER
LELAND S. INSCHO
BY Curtis H. Castleman Jr INVENTORS.
DONALD A. KESINGER
LELAND S. INSCHO
BY Curtis H. Castleman Jr.

TRANSPLANT HANDLING MEANS

BACKGROUND OF THE INVENTION

This invention relates to a transplant handling means in which seedlings supported along a continuous transplant tape are adapted to be planted in uniform spaced relationship.

It has been the common practice in automated seed tape planting to plant individual seeds at approximately equally spaced intervals by spacing individual seeds along the length of two rolls of paper to form a seed tape, and then tearing off and planting at the proper location segments of the tape containing a single seed. The process described in U.S. Pat. No. 3,294,045 (Kelley) proceeds a step further beyond conventional methods by treating the seed tape to pregerminate all of the seeds contained in the tape prior to placement into the ground. In Kelley, pregermination is defined to mean that the seed tape is placed in a controlled environment for a period of time necessary to bring the seeds to the point where the roots are just ready to emerge from the seed coat.

While continuous seed tape planting methods have shown advantages over traditional random planting of seeds, the methods suffer from a number of drawbacks which are overcome by the present invention. One such drawback is that seeds, as compared with seedlings, are more susceptible to certain adverse environmental conditions within the field. For instance, seeds are generally more affected than transplants by insects such as root maggot and various weeds. At the same time bare seeds are more sensitive to herbicides and insecticides than seedlings or transplants. Thus, in the case of seedlings or transplants, it is possible at the time of planting to use increased strength post emergence herbicides rather than conventional pre-emergence herbicides. Another advantage of using seedlings which are already well established is that the crops will mature earlier for harvest and may grow over a longer period of time, thereby producing a larger crop that is more highly developed, e.g. in the case of sugar beets producing a larger crop with higher sugar content per sugar beet harvested.

A further advantage of employing transplants over seeds is that the preculturing period of the transplant provides a head start which will particularly be advantageous in relatively cold climates such as found in Minnesota and Colorado, where the growing season is oftentimes too short for a variety of crops. Other advantages of the invention include a process by which substantial uniform emergence of all seedlings is obtained so that a one-pass harvest is all that is necessary; the need for hand or mechanical thinning is minimized; and such common emergence problems as soil crusting, salt accumulation, high temperature impeding germination, poor aeration and damp-off are obviated.

Another important advantage of the present invention is the provision of improved transplant carrier tape constructions in which there is maximized area for emergence and development of the seedlings through relatively large openings in the tape structure, and porosity is provided in the tape containers to enhance transfer of moisture and gases to the seedlings during preculture and after planting. Still another advantage is realized by provision of means to maintain the position of the ungerminated seeds and support medium in the tape containers during handling and transport, prior to preculture.

The most pertinent prior art known to the applicants may be found in U.S. Pat. Office classifications Class 47, 53, 61, and 111. Exemplary references include U.S. Pat. Nos. 3,172,234 to Eavis; 3,177,616 to Sawyer; 3,305,968 to Dosedla et al., British Patent No. 1,030,658 and German Pat. specification 1,877,266.

The above enumerated advantages, inter alia, are met, and the disadvantages of the prior art overcome by employing the process and configuration of the present invention.

SUMMARY OF THE INVENTION

Briefly described, one aspect of the invention comprises a process for treating seeds including: (1) forming a continuous transplant carrier tape having spaced containers or capsules in which is inserted an individual seed and media to support its growth, and (2) germinating and preculturing the seeds within the capsules for at least a period of time to allow radical and cotyledon to emerge from the seeds and develop for a further period of time. In one embodiment of the invention, the continuous transplant carrier tape may comprise a long flexible cover or support backing on which is affixed at spaced intervals in corrugated cardboard-like fashion a plurality of receptacles to form capsules or containers having openings means for emergence of the growing plant, and aperture means to allow the exchange of moisture and gases through the capsules. The continuous transplant carrier is adapted to be fed through a planting mechanism which individually severs and plants the containers and the included plants in soil or other nutrient environment.

The method and apparatus of the invention is particularly adapted to the planting of row crops which may be ordinarily transplanted, such as sugar beets, lettuce, broccoli, cauliflower, tomatoes and cabbage.

BRIEF DESCRIPTION OF THE DRAWINGS

In the drawings, in which like numerals refer to like parts in the several figures, FIG. 1 depicts a partial cutaway view of a portion of a continuous transplant carrier tape prior to preculturing; FIG. 1a is a sectional view of FIG. 1 taken along Section 1a–1a; FIG. 2 is an elevational view of an alternative transplant tape configuration shown after a portion of the preculturing period has elapsed.

PREFERRED EMBODIMENTS OF THE INVENTION

Figure 3:
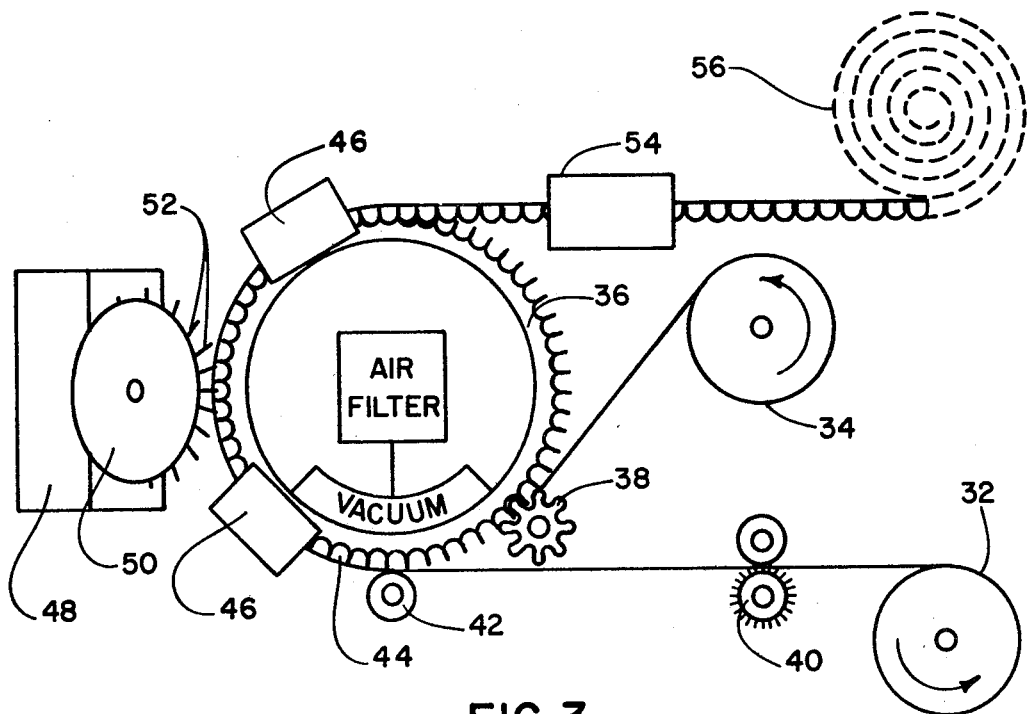
FIG. 3 is a schematic view of apparatus adapted to form the transplant tape.

The invention will be more fully particularized by reference to the accompanying drawings which depict preferred, but non-limiting embodiments of the invention.

1. Transplant Carrier Tape

A five capsule segment of a continuous transplant carrier tape is shown in FIGS. 1 and 1a. The continuous carrier is generally designated at 10 and consists of a flexible backing 12 which functions as a cover onto which is firmly secured a series of spaced receptacles 14, which may be attached, for example, by heat sealing or by use of a suitable adhesive. The receptacles 14 are preferably formed by furrowing or wrinkling a long piece of suitable material and affixing valley portions to the backing. It is also preferred to taper the receptacle 14 at the bottom end 16 to facilitate root emergence and retainment of support media 24 and seed 26. This tapering procedure produces slack pleats 18 along the lower portion of the tape carrier. The upper end 20 and lower end 22 of the capsules are open to allow emergence of stems, leaves and roots, particularly taproots.

The contents of the capsule are preferably held in place by the use of retaining means 28, such as a water soluble binder. This binder also serves the important function of maintaining the desired position of the seeds in the capsules during handling and transport. A plurality of perforations 30 provide porosity in either the receptacle 14, backing 12, or both, for exchange of moisture and gases across the container wall. The final capsule arrangement takes on a corrugated cardboard or machine gun belt like configuration. An alternative capsule design is shown in the embodiment of FIG. 2 in which seedlings 27 is shown contained within a molded plastic capsule 29 having a generally middle hemispherical enclosure 31 to house and support the seed. This center section of the transplant enclosure has openings 25 provided for exit of the cotyledon and radical respectively. In this embodiment, the container 29 is heat sealed to a continuous paper backing 13. The capsule preferably is provided with openings at its end portions (not shown), although openings may be provided automatically at planting by a mechanism which punches out the capsule and severs the container at its extremities to produce openings at its margin. If the latter method is employed, the capsules should be of sufficient size to accommodate the precultured plant to avoid stunting its growth.

A number of types of seeds including vegetable, sugar beet and other types of seeds whose plants are commonly transplanted may be employed. Particularly applicable are high value row crops which may suffer from crowding or a short growing season, such as sugar beets, lettuce, broccoli, cauliflower, tomatoes and cabbage. For uniform emergence, it is preferred to selectively upgrade the seeds. It is preferred that of the seeds utilized, at least 90 percent, more preferably at least 95 percent, and most preferably at least about 99 percent germinate. Commonly employed methods of grading, exemplified by vibration techniques, the density-gravity table, color coding and air classification are useful. It has been found that in general the more dense seeds produce higher germination rates. If desired, a viability detection system may be employed to detect capsules having ungerminated seeds and a method employed to selectively remove the undesired capsule(s) and rejoin the continuous carrier tape. A photocell could be used in such a detection system.

The receptacles 14 and backing 12 may be made of the same different material. Preferably, the materials are made of a material suitable for rolling on a spool, for instance, and adapted to be handled by a mechanized planter. A variety of plastic materials including natural and synthetic resins such as cellulose acetate, butyrates, styrenes, saran, polyethylenes, etc., may be utilized. The thermoplastics are preferred for both backing and receptacle for economic reasons and since they may easily be joined together by heat sealing and the desired shape maintained by vacuum. Other suitable materials include cloth, absorbent filter paper (which has its own built-in porosity), light cardboard materials and foil. Various types of packaging film may be utilized.

The support media 24 may comprise aqueous medium, nutrient medium such as soil or vermiculite, insecticides, fungicides, herbicides, growth regulators, fertilizers or compatible mixtures thereof. Various other types of support media such as activated charcoal for herbicide protection, if necessary, could also be employed. The type of seeds and environment which the young transplant will be subjected to will dictate the optimum composition of support media. Water soluble binder 28 is provided as a sealant to maintain the support media and seed in the capsule during transport, handling, etc. A plug could be supplied by a water soluble pellet which would fit snugly into the capsule. Preferably, loose support medium is placed over the seed and this medium sprayed lightly with the water soluble binder or adhesive. Examples of suitable binders include starch, sugar solution, polyvinyl alcohol, polyacrylamides and cellulose derivatives such as hydroxyethyl cellulose. Alternatively, the seeds could be heat sealed or glued to the wall of the container 14 or backing 12 to thereby retain the seed in its proper position in the case handling or transport might cause excessive vibration and migration of the seed away from its initial position within the capsule. Also, the backing 12 could be provided with an extended portion adapted to be folded over the opening 20 to retain the contents of the capsule during transport, storage, etc.

2. Tape Manufacture

Figure 4:
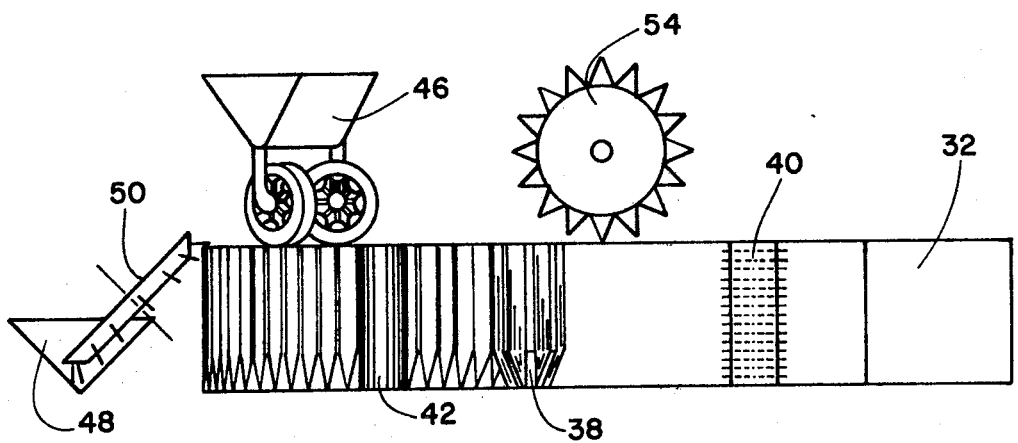
FIG. 4 is a schematic side view of FIG. 3.

An illustrative, non-limiting procedure for manufacturing continuous carrier transplant tape is shown in FIGS. 3 and 4. Accordingly, a first roll of plastic 34 such as 1 mil thick polyethylene is fed onto a large rotary die 36. The first stage of this rotary die has a matching die shape 38 which forms one half of the capsule as the roll of plastic is fed through the die. The shape and position of the plastic is maintained by a vacuum manifold built into the die. Alternative forming operations such as thermal forming or vacuum forming could be employed. A second sheet of plastic from roll 32 is fed through hot perforator 40 and over heat seal roller 42 to form a backing cover juxtaposed and firmly attached to the sheet of open faced receptacles carried by the rotating die 36.

The capsule envelope 44 formed by the heat sealing operation is next filled with support media metered in from the bin 46 to approximately one-fourth inch depth, for example, from the top of the capsule. The portion of support media released from the metering wheel is ejected with a horizontal velocity matched to coincide with the velocity of the rotating die 36, allowing continuous and high speed production.

At this point in the process, the partially filled capsule receives a seed from the seed selection device comprising a seed hopper 48 and a vacuum wheel pickup 50 having a plurality of fingers 52. The vacuum wheel rotates about an axis which is approximately 45° to the horizontal. The fingers 52 pick up a single seed and are made to release the seed at a position above the partially filled capsule which is traveling by. The vacuum wheel should be rotating at a speed necessary to supply a seed for each capsule. It may be sometimes advantageous to provide two vacuum fingers per capsule cavity to increase the probability that a seed will be present for each capsule. Control devices or detection systems can be utilized (such as use of a photo cell, electrostatic device or air flow) to insure that a seed is provided each capsule. One such method of control would be to use a hypodermic needle with the vacuum pick-up finger and adjust the vacuum level according to the weight and geometry of the particular seeds. In the case where more than one seed is picked up by the vacuum finger, a fluidic, pneumatic, electronic or other circuit can be used to detect the extra seed(s) and cause this finger to be bypassed in favor of a succeeding finger having a single seed.

Preferably, an additional small portion of support media is metered into the capsules to cover the seed. This depth will vary according to the type of seed utilized, although preferably the seed location is in the upper one-third portion of the capsule 14. At this point, it is preferred to spray a small amount of water soluble binder to maintain the growth medium in the capsule from spray nozzle 54. The capsules may also be sprayed from below, depending on whether the support medium has a tendency to spill out the bottom. Generally this will not be necessary because of the tapered design of the capsule. Once the capsules have been sprayed, the tape is preferably wound by machine onto a large roll which may contain, for example, from 4,000 to 25,000 capsules. These rolls of tape 56 may be provided with a pressure sensitive leader on each end so that they may be positioned on a planter for automated plantings and to prevent unrolling.

3. Germination and Preculture

The next step of the process involves transport of the transplant carrier tape to a suitable germination and preculturing environment such as a large germination environment chamber, or more preferably a green house. The requirements for germination will depend upon the particular type of seed and conditions under which the seed will eventually mature in the field. Optimum conditions of temperature, moisture level, aeration, light and the interaction of these factors should be maintained to optimize germination and overcome any germination blocks. For example, lettuce may require continuous lighting and temperatures less than 76° Fahrenheit, preferably from about 59° to 65° Fahrenheit. For sugar beets, the optimum temperature will be somewhat greater than that for lettuce, generally in the range approximately near of 65° to 85° Fahrenheit. Cooler temperatures maintained at night may help to improve field survival after transplanting.

For any particular seed to germinate, a definite amount of water must be absorbed, and this moisture requirement may be provided by irrigation or subirrigation using a sprinkler system, misting or soaking. Preferably, an automatic sprinkler system would be maintained to provide the necessary moisture either continuously or at intervaled time periods.

The length of preculturing will be dependent upon the temperature, moisture level, lighting, particular type of seed, etc., but in general will extend for a period of time at least to allow radical and cotyledon to totally emerge from the seed coats. Preferably, the time period is extended well beyond the time when radical and cotyledon emerge. In general, the preculturing time period will preferably extend for from about 10 days to about 10 weeks. As an example, in the culturing of sugar beets, it is preferred that the preculturing time period last for a least from about 6 to about 12 weeks, more preferably from about 8 to 10 weeks. This extra length of culturing has been found to greatly enhance the ultimate performance of the seedlings in the field and resultant crop production and quality, as well as providing improved resistance to herbicides, insecticides, frost, etc.

Once the continuous transplant carrier tape has been subjected to germination and preculturing, the transplant tapes are ready to be attached to the planter which will sever individual capsules, inserting them into the soil one at a time at whatever spacing is desired. Preferably, upright growth attitude of the seedlings is maintained during planting.

4. Field Examples

As an illustrative example of the advantages of the present invention, a 6 × 6 Latin Square was laid out on a farm in East Grand Forks, Minnesota, and planted with hybrid sugar beet seeds and transplants according to the present invention. Each plot measured 35 feet in length and 44 inches in width. Various sizes of the sugar beet seeds including coated and uncoated seeds were planted in a number of the plots. A number of transplant capsules according to the present invention which had been precultured in a germinating environment for about 8 to 9 weeks were also planted in certain of the plots of the Latin Square. The tape capsule construction was essentially identical to that shown in FIG. 1, where the backing and compartment capsules were made of 1 mil polyethylene heat sealed together. The support medium used in the capsules consisted of vermiculite, peat moss, basic nutrients and trace elements. The resulting yield showed that the transplant sugar beets according to the present invention produced a gross sugar increase of 16.6 weight percent greater than the yields produced from the directly seeded control sample.

A test similar to the above was carried out on the same farm using four replicated plots and control plots of sugar beets. The preculturing time period was 11 days. The transplanted sugar beets yielded a 7 percent gross increase in sugar content over the control samples.

5. Modifications of the Invention

It should be understood that the invention is capable of a variety of variations and modifications which will be made apparent to those skilled in the art by a reading of the present specification. One example of such a modification is a variation of the transplant tape structure, where the backing 12 and receptacle 14 are matching concave elements, i.e. mirror images, bonded together at various locations to form the capsules. As a further example, the backing cover 12 could be a continuous flat sheet, carrying individually attached molded receptacles sealed to the backing rather than a series of furrows or wrinkles formed from a continuous plastic sheet. Furthermore, individual capsules could be supported on a flexible backing or carrier made of wire, tubing, filiament, string or other support. All such modifications and variations are meant to be included within the scope of the present invention as defined by the appended claims.

We claim:

1. A transplant carrier comprising:
 a. a flexible backing;
 b. a plurality of receptacles comprising wall portions firmly attached to said backing at a plurality of locations therealong and the combined backing and receptacles forming a series of spaced capsules containing therein a germinated seed or plant and loosely packed growth media, each individual capsule having an upper opening for emergence of stem and leaves, and a lower opening for emergence of roots;
 c. aperture means in either or both of said backing and walls of said receptacle of sufficient size for providing exchange of moisture and gases, yet said size of the aperture means being sufficiently small to retain substantially all of the growth media within the capsules;
 said wall portions of the receptacle comprising an upper and a lower portion, said lower portion tapering and funneling downwardly to said lower opening for facilitating root growth and emergence; and
 d. means within said receptacle retaining said growth media in relative position within the capsule.

2. The carrier of claim 1 wherein the backing and receptacles are formed of sheets of plastic material.

3. The carrier of claim 2 wherein the shape of the backing and receptacles are essentially the same, and the two are bonded back to back at spaced locations to form a continuous tape having spaced containers.

4. The carrier of claim 1 formed in a manner substantially resembling a corrugated configuration.

5. The carrier of claim 1 wherein a water soluble binder is incorporated into the capsule contents at either or both of its said openings to provide said retaining means.

6. The carrier of claim 1 wherein the aperture means include apertures uniformly distributed substantially throughout the walls of said receptacle, backing member or both.

7. The carrier of claim 1 wherein said wall portion of the receptacle additionally contains a generally hemispherical middle portion housing and retaining said germinated seed.

* * * * *